United States Patent
Asadi et al.

(10) Patent No.: US 11,784,370 B2
(45) Date of Patent: Oct. 10, 2023

(54) TRANSITION METAL PHOSPHIDES FOR HIGH EFFICIENT AND LONG CYCLE LIFE METAL-AIR BATTERIES

(71) Applicants: Mohammad Asadi, Chicago, IL (US); Alireza Kondori, Chicago, IL (US); Mohammadreza Esmaeilirad, Chicago, IL (US)

(72) Inventors: Mohammad Asadi, Chicago, IL (US); Alireza Kondori, Chicago, IL (US); Mohammadreza Esmaeilirad, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 0 days.

(21) Appl. No.: 16/980,137

(22) PCT Filed: Mar. 13, 2019

(86) PCT No.: PCT/US2019/022024
§ 371 (c)(1),
(2) Date: Sep. 11, 2020

(87) PCT Pub. No.: WO2019/178210
PCT Pub. Date: Sep. 19, 2019

(65) Prior Publication Data
US 2021/0013566 A1    Jan. 14, 2021

Related U.S. Application Data

(63) Continuation of application No. 62/642,058, filed on Mar. 13, 2018.

(51) Int. Cl.
*H01M 12/08*    (2006.01)
*H01M 4/38*    (2006.01)
(Continued)

(52) U.S. Cl.
CPC ........... *H01M 12/08* (2013.01); *H01M 4/382* (2013.01); *H01M 4/5805* (2013.01); *H01M 4/90* (2013.01); *H01M 2300/0045* (2013.01)

(58) Field of Classification Search
None
See application file for complete search history.

(56) References Cited

U.S. PATENT DOCUMENTS 5,346,785 A * 9/1994 Akuto ................. H01M 10/465
429/111
9,799,893 B2   10/2017 Campbell
(Continued)

FOREIGN PATENT DOCUMENTS

JP     2016167413 A  *  9/2016
WO    WO 2016/100204 A2    6/2016

OTHER PUBLICATIONS

Machine English Translation of JP-2016167413-A originally published to Nohara Sep. 2016 (Year: 2016).*
(Continued)

*Primary Examiner* — Ula C Ruddock
*Assistant Examiner* — Mary Grace Byram
(74) *Attorney, Agent, or Firm* — Pauley Erickson & Swanson

(57) ABSTRACT

An electrochemical cell and method of use, including an anode of metal, an air permeable cathode, an electrolyte between the anode and the cathode, and a transition metal phosphide catalyst on the cathode or between the cathode and the electrolyte. Also, a method of generating electrical current with an electrochemical cell by introducing a transition metal phosphide catalyst on a cathode side of the electrochemical cell. The catalyst can be in the form of any suitable nanostructure, such as molybdenum phosphide nanoflakes.

16 Claims, 5 Drawing Sheets

(51) Int. Cl.
    *H01M 4/58*     (2010.01)
    *H01M 4/90*     (2006.01)

(56) References Cited

U.S. PATENT DOCUMENTS

| | | |
|---|---|---|
| 2016/0145752 A1 | 5/2016 | Salehi et al. |
| 2016/0172688 A1 | 6/2016 | Kim et al. |
| 2016/0204490 A1* | 7/2016 | Scott .................. H01M 4/8668 429/405 |
| 2016/0380273 A1* | 12/2016 | Wu ..................... H01M 4/8605 429/405 |
| 2017/0128917 A1* | 5/2017 | Hunt .................... H01M 4/925 |
| 2017/0267109 A1 | 9/2017 | Graefenstein et al. |
| 2017/0373311 A1* | 12/2017 | Salehi-Khojin ....... H01M 4/466 |

OTHER PUBLICATIONS

Liu et al, The Role of Active Oxide Species for Electrochemical Water Oxidation on the Surface of 3d-Metal Phosphides, Feb. 12, 2018, Advanced Energy Materials, 1703290 (Year: 2018).*

ISA/US, English language verison of the International Search Report, Form PCT/ISA/210, for International Application PCT/US2019/022024, dated May 24, 2019 (1 page).

ISA/US, Form PCT/ISA/237, Written Opinion of the International Searching Authority, for International Application PCT/US2019/022024, dated May 24, 2019 (5 pages).

* cited by examiner

TRANSITION METAL PHOSPHIDES FOR HIGH EFFICIENT AND LONG CYCLE LIFE METAL-AIR BATTERIES

CROSS REFERENCE TO RELATED APPLICATION

This application claims the benefit of U.S. Application Ser. No. 62/642,058, filed on 13 Mar. 2018. This co-pending application is hereby incorporated by reference herein in its entirety and is made a part hereof, including but not limited to those portions which specifically appear hereinafter.

BACKGROUND OF THE INVENTION

This invention relates generally to chemical-based energy production and/or storage and, more particularly, to metal-air batteries and nanostructured catalytic materials for improved batteries.

Recent advances as well as dropping technology costs have made the development of carbon-free energy more feasible than ever. However, a transition toward clean energy technology requires a revolution in energy storage systems, generally known as a bottleneck for this transition. Today, lithium-ion batteries are recognized as the conventional energy storage systems used in many electronic devices. However, this technology has reached its theoretical limits making the goal of an efficient and inexpensive large-scale energy storage system seemingly impossible.

Among different emerging technologies, the metal-air battery is a promising alternative to Li-ion battery due to a several times higher theoretical specific energy. A metal-air battery is an electrochemical cell having an anode generally of pure metal and an external cathode of ambient air. An aqueous or aprotic electrolyte is also typical. During discharge of a metal-air electrochemical cell, an oxygen reduction reaction occurs in the ambient air cathode while the metal anode is oxidized.

The excessive specific energy of this new generation battery compared to the state of the art of existing technologies could result in a very inexpensive and compact battery that is well suited for large-scale application such as long-range electric vehicles (EVs). This technology can also be used as a main energy storage system for solar and wind power planets increasing the contribution of renewable energy in the electricity generation and supply by resolving their intermittency challenges.

SUMMARY OF THE INVENTION

A general object of the invention is to provide improved energy storage systems, particularly metal-air/$O_2$ batteries, and compositions and components therefore. The invention provides nanostructured catalysts working with electrolytes as a co-catalyst system.

The invention includes an electrochemical cell, such as a metal-air battery, including a metal anode, a cathode that allows an air flow, an electrolyte disposed between the anode and the cathode, and a catalyst in combination with the cathode. The cathode can include an air-permeable porous structure disposed between the cathode and the electrolyte. The cathode can be coated with the catalyst.

Embodiments of this invention incorporate an earth-abundant and inexpensive transition metal phosphide class of catalyst that can be useful in large-scale energy storage technologies. Establishing this class of materials with outstanding catalytic properties will also encourage the researcher to use them in other catalysis processes for sustainable energy technologies that are mainly stymied due to lack of suitable and inexpensive materials.

The invention further includes a method of generating electrical current with an electrochemical cell by introducing a transition metal phosphide catalyst on a cathode side of the electrochemical cell. The catalyst provides or improves formation of superoxides in the electrochemical cell over peroxides. In embodiments of this invention, the method includes contacting the cathode to oxygen, allowing the metal of the anode to be oxidized to metal ions, and allowing the oxygen to be reduced at a surface of the transition metal dichalcogenide to form one or more metal oxides with the metal ions, thereby generating the electrical potential between the anode and the cathode.

Other objects and advantages will be apparent to those skilled in the art from the following detailed description taken in conjunction with the appended claims and drawings.

DETAILED DESCRIPTION OF THE INVENTION

The present invention provides energy storage systems incorporating transition metal catalysts, such as nanostructured transition metal phosphide catalysts (TMPs). The catalysts of this invention provide improved electrocatalytic activity for both oxygen reduction reaction (ORR) and oxygen evolution reaction (OER), which are two basic reactions during battery discharge and charge processes, respectively.

Figure 1:
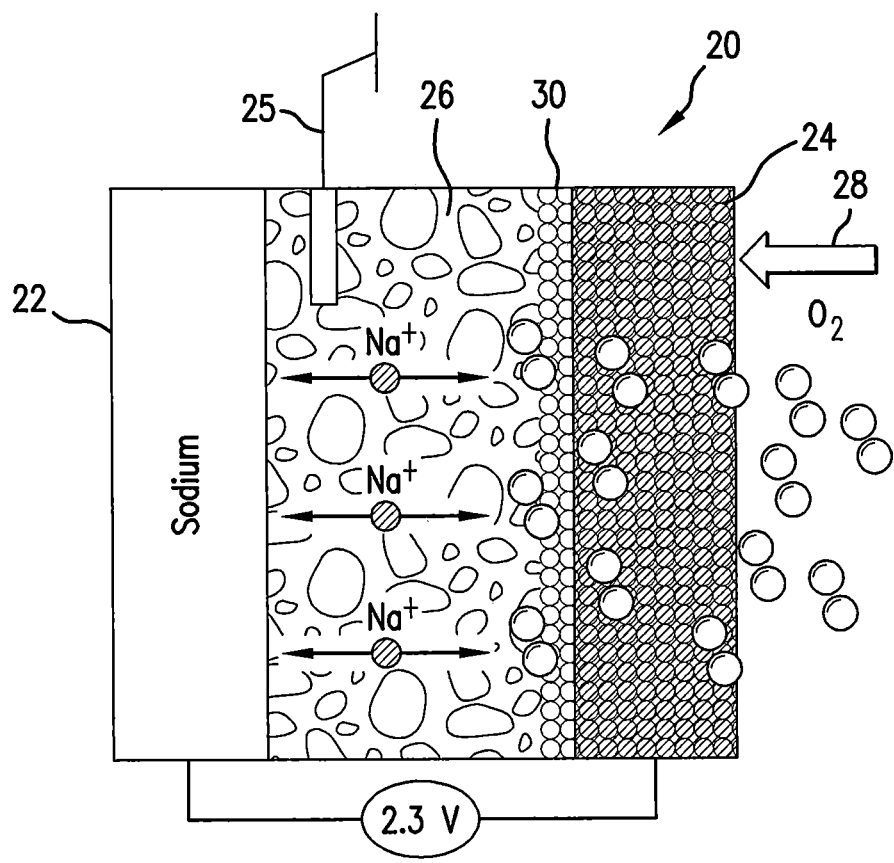
FIG. 1 shows a cross-section representation of a Na-air ($O_2$) battery according to one embodiment of this invention.
Figure 2:
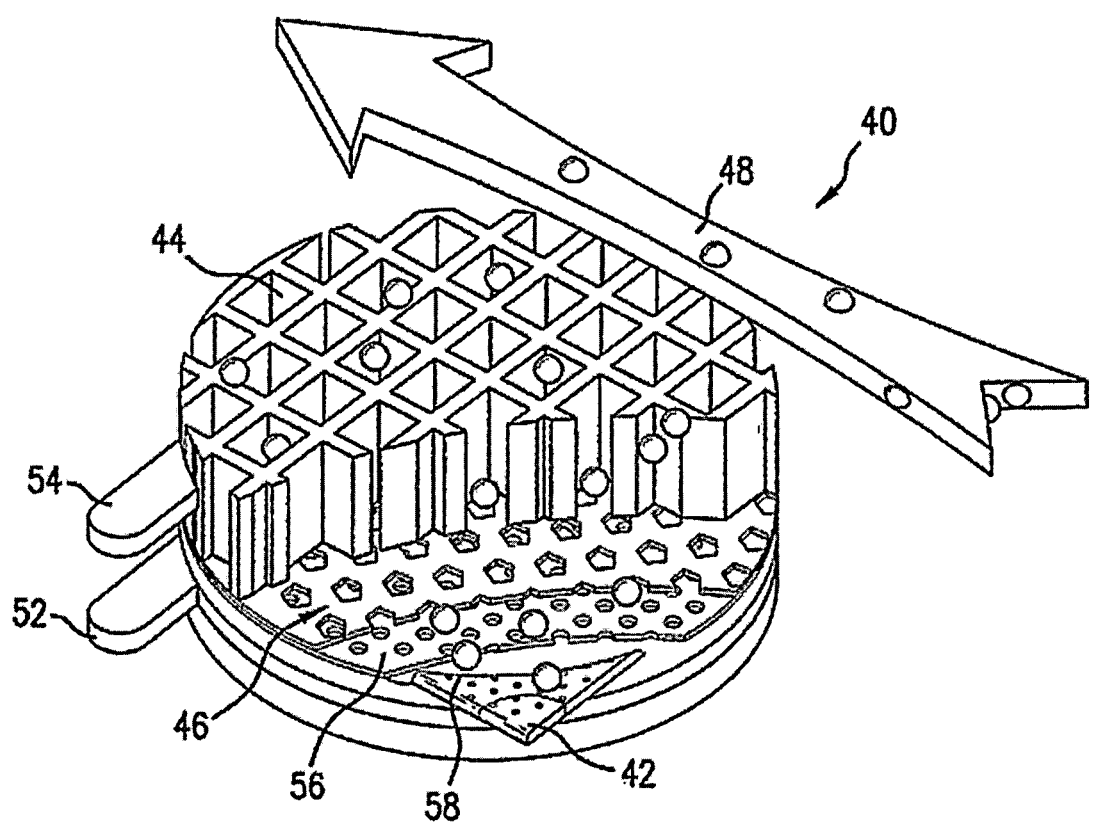
FIG. 2 shows a partial sectional representation of a Na-air ($O_2$) battery according to one embodiment of this invention.

FIGS. 1 and 2 illustrate incorporation of the catalyst into battery systems according to embodiments of this invention. FIG. 1 shows a cross-section of a Na-air ($O_2$) electrochemical cell 20, such as a metal-air battery, according to one embodiment of this invention. The cell 20 includes an anode 22, a cathode 24, and an electrolyte 26 disposed between the anode 22 and the cathode 24. The cathode provides an air flow 28, and is desirable formed of an air-permeable porous material, such as a carbon material. The porous material can also be electrically conductive. As shown in FIG. 1, the cell 20 can also include an optional reference electrode 25 in contact with the electrolyte.

The invention provides a catalyst, such as working with electrolytes as a co-catalyst system. As shown in FIG. 1, the catalyst 30 is disposed on the cathode side, such as between the cathode 24 and the electrolyte 26. In embodiments of this invention, the catalyst is coated on the cathode 24, such as coated on the porous structure. The catalyst 30 is disposed between the sodium-based electrolyte 26 and the air-permeable porous structure 24, which allows oxygen to contact the catalyst 30 and the electrolyte 26.

FIG. 2 is an exemplary schematic of a continuous air flow Na-air battery cell 40 according to one embodiment of this invention. The cell includes an anode 42, a cathode 44, and electrode 46. The cell 40 also includes an anode current collector 52, a cathode current collector 54, a cell guard membrane 56, and an anode protection layer 58 In this embodiment the air electrode (cathode) 44 is porous for air stream 48 and coated with the nanostructured catalyst of this invention. Various and alternative sizes (1 to 1000 nm), amounts, shapes, and configurations are available for the battery, the electrodes, and the catalyst material, depending on need.

Anodes of embodiments of this invention are formed of metal, and desirable consisting essentially of metal (meaning fully metal with only minor, insignificant other components/impurities). Exemplary metals include lithium, sodium, potassium, calcium, magnesium, zinc, and aluminum.

Electrolytes of embodiments of this invention include any suitable salt, such as corresponding to the anode metal. For example, lithium salts are used to increase the lithium ion conductivity in the electrolyte, this is the case for other anode metals such as sodium, calcium, magnesium, zinc, and aluminum. The electrolyte can also include redox mediators, namely chemicals with electrochemical activity used to improve the activity of the reduction and oxidation reactions happening on the catalyst surface.

Electrolytes of embodiments of this invention include any suitable ionic liquid. Exemplary ionic liquids include an anion and a cation selected from imidazolium, pyridinium, pyrrolidinium, phosphonium, ammonium, choline, sulfonium, prolinate or methioninate cations. As a further example, an exemplary imdazolium cation is of the formula:

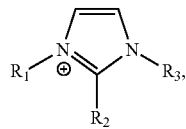

where each of $R_1$, $R_2$, and $R_3$ is independently one of hydrogen, linear aliphatic $C_1$-$C_6$ group, branched aliphatic $C_1$-$C_6$ group, or cyclic aliphatic $C_1$-$C_6$ group. In one embodiment of this invention $R_2$ is hydrogen, and each of $R_1$ and $R_3$ is independently a linear or branched $C_1$-$C_4$ alkyl. Exemplary anions include $C_1$-$C_6$ alkylsulfate, tosylate, methanesulfonate, bis(trifluoromethylsulfonyl)imide, hexafluorophosphate, tetrafluoroborate, triflate, halide, carbamate, sulfamate, and combinations thereof. In one embodiment, the ionic liquid includes 1-ethyl-3-methylimidazolium tetrafluoroborate. The electrolyte desirably includes at least 90% of the ionic liquid, and preferably is substantially free of water or non-ionic liquid organic solvents.

Catalysts of embodiments of this invention include a transition metal catalyst, and desirably a tri-transition metal catalyst. Exemplary catalysts include transition metal phosphide catalysts, such as, without limitation, $Ti_nP_m$, $V_nP_m$, $Cr_nP_m$, $Zr_nP_m$, $Nb_nP_m$, $Mo_nP_m$, $Hf_nP_m$, $W_nP_m$, $Ta_nP_m$, $Tc_nP_m$, and $Re_nP_m$, wherein each n and m is independently one of 1, 2, 3, 4 and 5.

In embodiments of this invention, the catalyst comprises a plurality of nanoparticles. The nanoparticles have an average size between about 1 nm and 1000 nm, more between 1 nm and about 400 nm. Exemplary nanoparticle shapes include, without limitation, nanoflakes, nanosheets, nanoribbons, and combinations thereof.

One exemplary catalyst of this invention includes molybdenum (Mo) terminated molybdenum phosphide nanoflakes (MoP NFs). The catalyst can be, without limitation, $Mo_3P$, MoP, or $MoP_2$. Experimental data has revealed the turn over frequency (TOF)—per atom activity—of MoP NFs is more than two orders of magnitude higher than noble metal catalysts such as gold (Au) and platinum (Pt) nanoparticles. The performance of this catalyst in sodium-oxygen (Na—$O_2$) batteries has revealed that using MoP NFs on the cathode side and an ionic liquid/DMSO electrolyte of the cell make the formation of the sodium superoxide ($NaO_2$) more favorable than sodium peroxide ($Na_2O_2$). As a result, the cell overpotential of 600 mV can be obtained, which is approximately two times lower than the state of the art existing system in the literature (1000 mV). The formation of the $NaO_2$ as the product was confirmed by using in-situ differential electrochemical mass spectroscopy (DEMS) where the number of the electron per mole of $O_2$ was calculated to be 1.07 during the charging process. Preliminary results also revealed that this system can work up to 100 cycles in a pure $O_2$ environment.

Figure 3A:
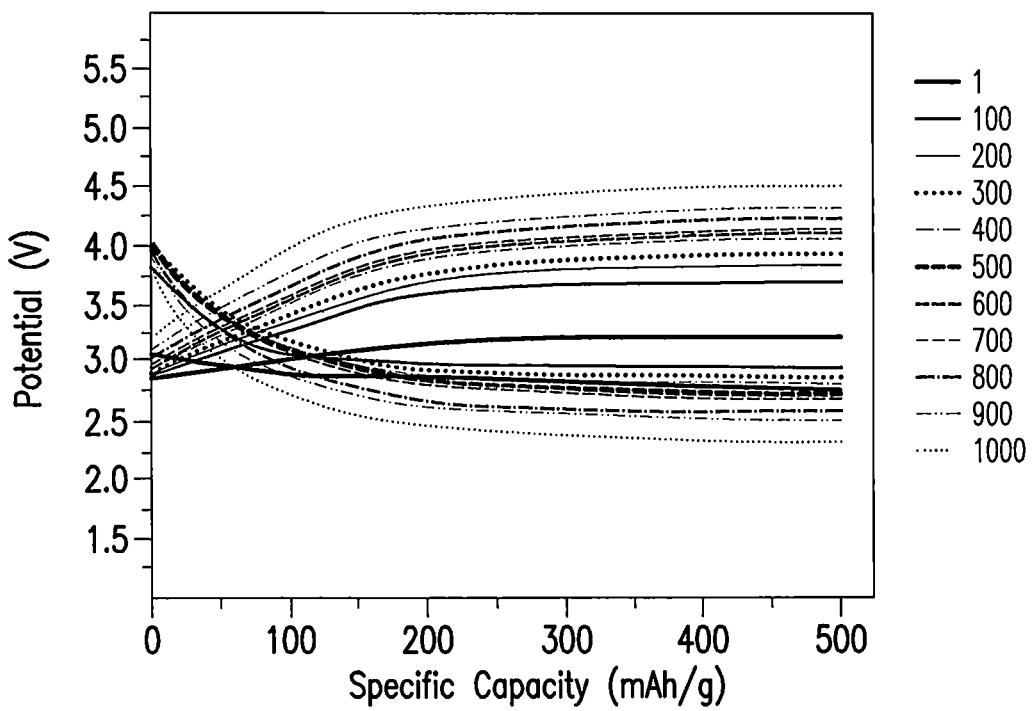
FIGS. 3A-F summarize test results according to embodiments of this invention.
Figure 3B:
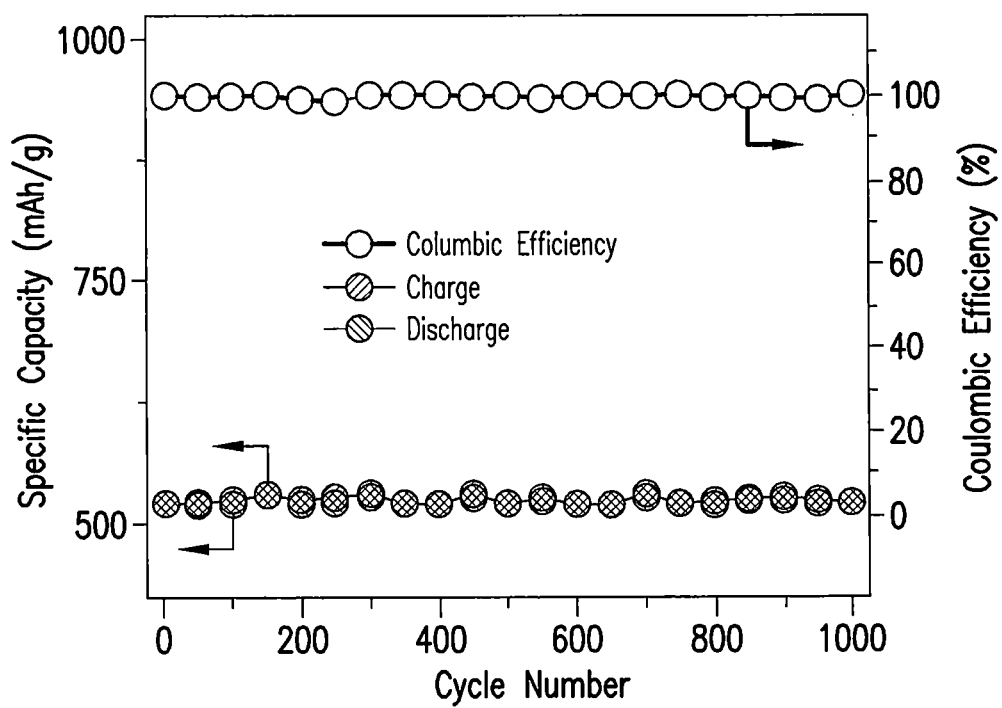
Figure 3C:
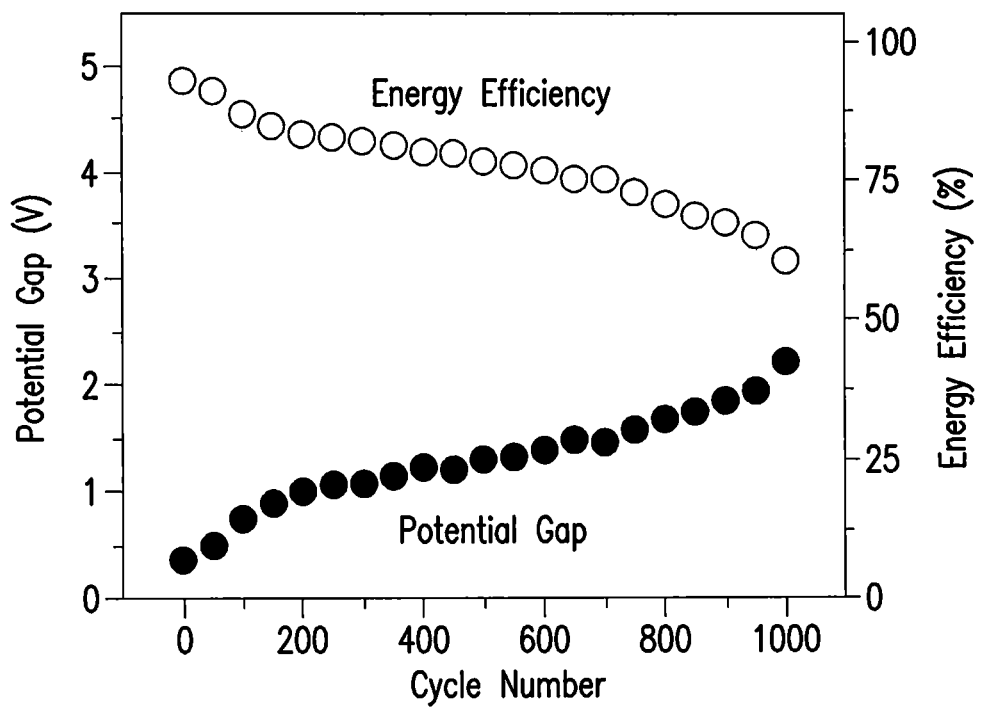
Figure 3D:
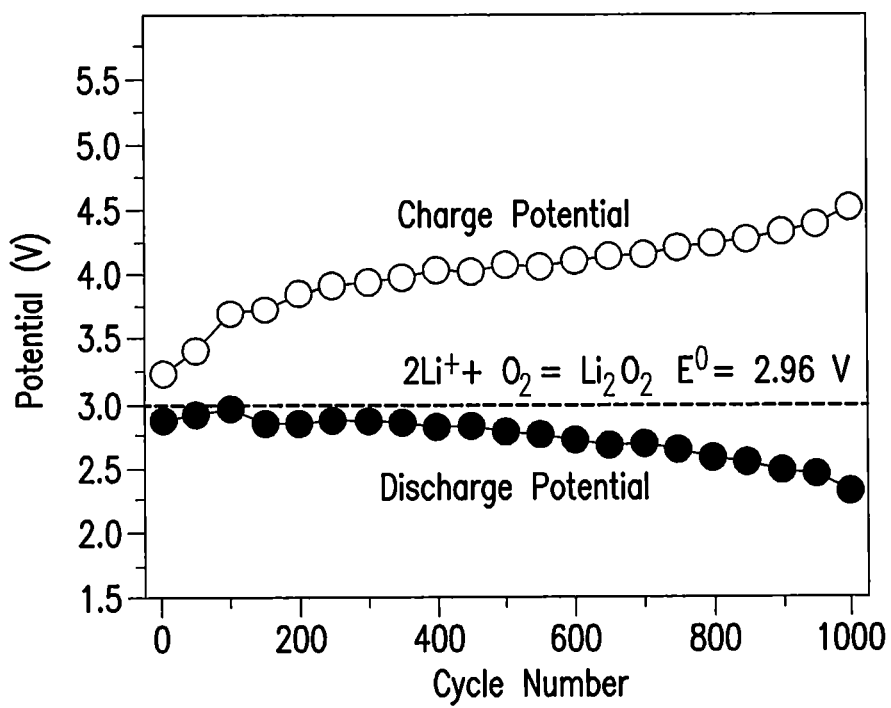
Figure 3E:
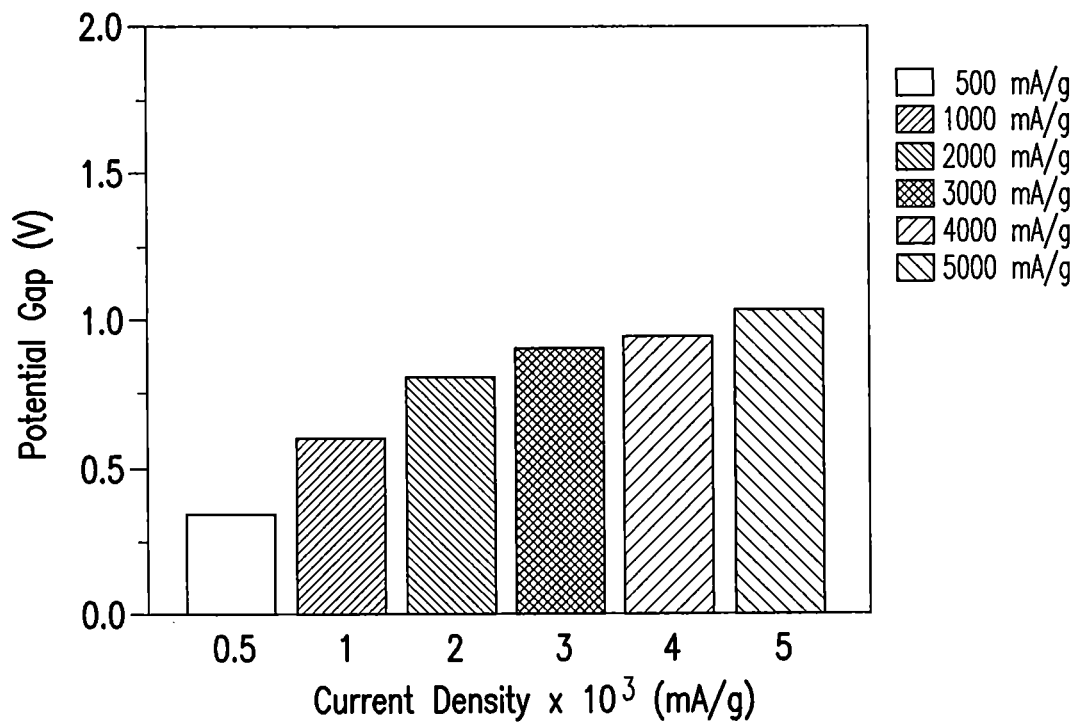
Figure 3F:
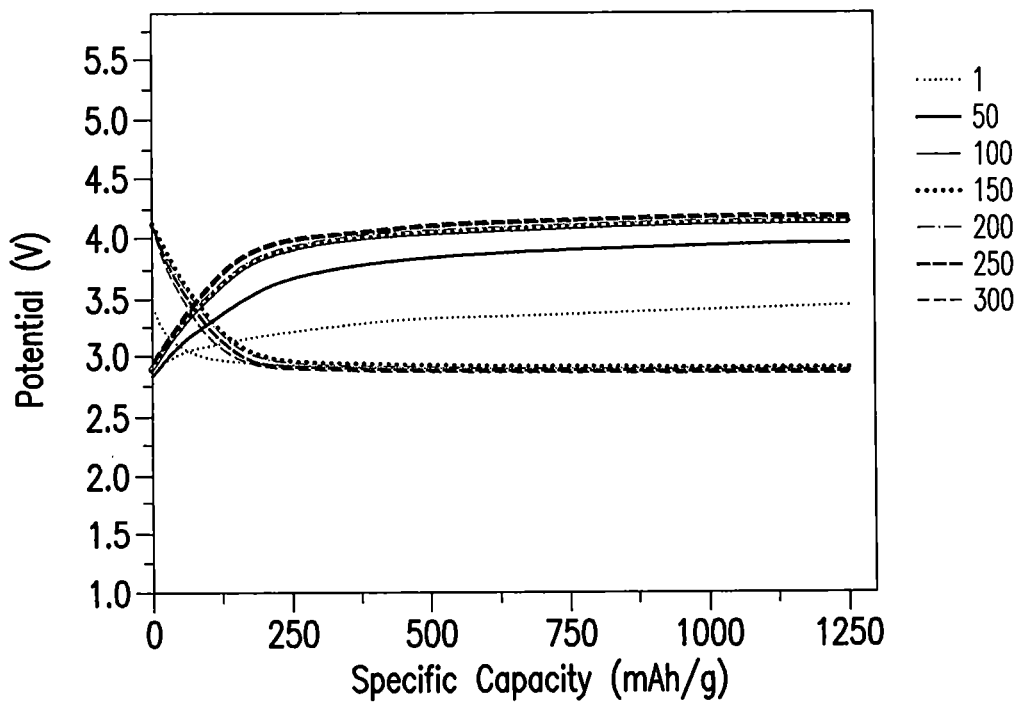

FIGS. 3A-F summarize testing using of a cell according to this invention. The electrolyte was 0.3M LiTFSI dissolved in DMSO:IL (75/25) with redox mediators as additives. The amount of $Mo_3P$ coating is 0.1 mg cm$^{-2}$. FIG. 3A shows charge/discharge profiles over 1000 cycles at constant density of 500 mA/g and the constant specific capacity of 500 mAh/g. FIG. 3B shows changes in discharge specific capacity, charge specific capacity (lower dots), and the corresponding coulombic efficiency (upper dots) over 1000 cycles. FIG. 3C shows changes in polarization gap and energy efficiency over 1000 cycles. FIG. 3D shows discharge and charge potential values over 1000 cycles. The graph shows the stable discharge overpotential up to 600 cycles with respect to the electrochemical potential for $Li_2O_2$ formation, at 2.96V. FIG. 3E shows the polarization gap as a function of current density while the specific capacity is constant at 500 mAh/g. FIG. 3F shows charge/discharge profiles over 300 cycles at a constant density of 500 mA/g and the specific capacity of 1250 mAh/g.

The invention thus provides transition metal catalysts for use in battery systems. The catalysts of this invention provide improved electrocatalytic activity for both oxygen reduction reaction (ORR) and oxygen evolution reaction (OER), which are two basic reactions during battery discharge and charge processes, respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An electrochemical cell, comprising:
    an anode comprising metal;
    a cathode comprising an air flow;
    an electrolyte disposed between the anode and the cathode, the electrolyte configured for oxygen reduction reaction and oxygen evolution reaction and comprising a combination of an ionic liquid and dimethyl sulfoxide (DMSO); and
    a catalyst in combination with the cathode, wherein the catalyst comprises a nanosized tri-molybdenum phosphide catalyst selected from nanoparticles, nanoflakes, nanosheets, nanoribbons, and combinations thereof.

2. The electrochemical cell according to claim 1, wherein the anode consists essentially of the metal.

3. The electrochemical cell according to claim 2, wherein the metal of the anode is selected from lithium, sodium, potassium, calcium, magnesium, zinc, and aluminum.

4. The electrochemical cell according to claim 1, wherein the metal of the anode is lithium.

5. The electrochemical cell according to claim 1, wherein the cathode is coated with the catalyst.

6. The electrochemical cell according to claim 1, wherein the cathode comprises an air-permeable porous structure.

7. The electrochemical cell according to claim 6, wherein the porous structure is electrically-conductive.

8. The electrochemical cell according to claim 1, wherein the catalyst is disposed between the cathode and the electrolyte.

9. The electrochemical cell according to claim 1, further comprising a reference electrode disposed in contact with the electrolyte.

10. The electrochemical cell according to claim 1, wherein the catalyst comprises $Mo_3P$.

11. The electrochemical cell according to claim 1, wherein the ionic liquid includes an anion and a cation selected from imidazolium, pyridinium, pyrrolidinium, phosphonium, ammonium, choline, sulfonium, prolinate or methioninate cations.

12. The electrochemical cell of claim 11, wherein the cation comprises imidazolium of the formula:

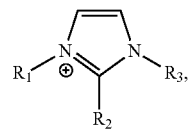

wherein $R_2$ is hydrogen, and each of $R_1$ and $R_3$ is independently a linear or branched $C_1$-$C_4$ alkyl.

13. The electrochemical cell of claim 11, wherein the anion is selected from the group consisting of $C_1$-$C_6$ alkylsulfate, tosylate, methanesulfonate, bis(trifluoromethylsulfonyl)imide, hexafluorophosphate, tetrafluoroborate, triflate, halide, carbamate, sulfamate, and combinations thereof, wherein the electrolyte is substantially free of water.

14. The electrochemical cell according to claim 11, wherein the ionic liquid comprises 1-ethyl-3-methylimidazolium tetrafluoroborate.

15. A method of generating an electrical potential, comprising:
    providing an electrochemical cell according to claim 1;
    contacting the cathode to oxygen;
    allowing the metal of the anode to be oxidized to metal ions; and
    allowing the oxygen to be reduced at a surface of the transition metal dichalcogenide to form one or more metal oxides with the metal ions, thereby generating the electrical potential between the anode and the cathode.

16. The electrochemical cell according to claim 1, wherein the catalyst improves formation of superoxides in the electrochemical cell over peroxides.

* * * * *